United States Patent [19]

Tsuneda et al.

[11] 4,354,620

[45] Oct. 19, 1982

[54] REFUELING SYSTEM ADAPTED TO GASOLINE SERVICE STATION

[75] Inventors: Kazuhiko Tsuneda, Momoyamamourinagatohigashimachi; Sigeru Sagane; Hiroaki Haba, both of Kawanishi, all of Japan

[73] Assignee: Matsushita Electric Industrial Co., Ltd., Osaka, Japan

[21] Appl. No.: 152,677

[22] Filed: May 23, 1980

[30] Foreign Application Priority Data

May 23, 1979 [JP] Japan .................................. 54-63672

[51] Int. Cl.³ .............................................. B67D 5/08
[52] U.S. Cl. ....................................... 222/14; 222/25; 235/92 FL
[58] Field of Search ............................... 222/2, 14–20, 222/25–28; 194/3, 13; 235/92 FL

[56] References Cited

U.S. PATENT DOCUMENTS 3,598,283 8/1971 Krutz et al. ............................ 222/14
3,632,988 1/1972 Yamawaki et al. ..................... 222/2
3,768,617 10/1973 Young ................................... 194/13

Primary Examiner—Joseph J. Rolla
Attorney, Agent, or Firm—Spencer & Kaye

[57] ABSTRACT

A refueling system adapted to a gasoline service station. The system comprises a refueling machine unit for feeding fuel, a flowmeter for measuring the amount of fed fuel and a controller for setting the amount of fuel to be fed. The controller also reads out the amount of fuel being fed so as to control the refueling machine unit, whereby fuel can be sold automatically and accurately corresponding to an amount ordered or a price offered by the customer.

2 Claims, 6 Drawing Figures

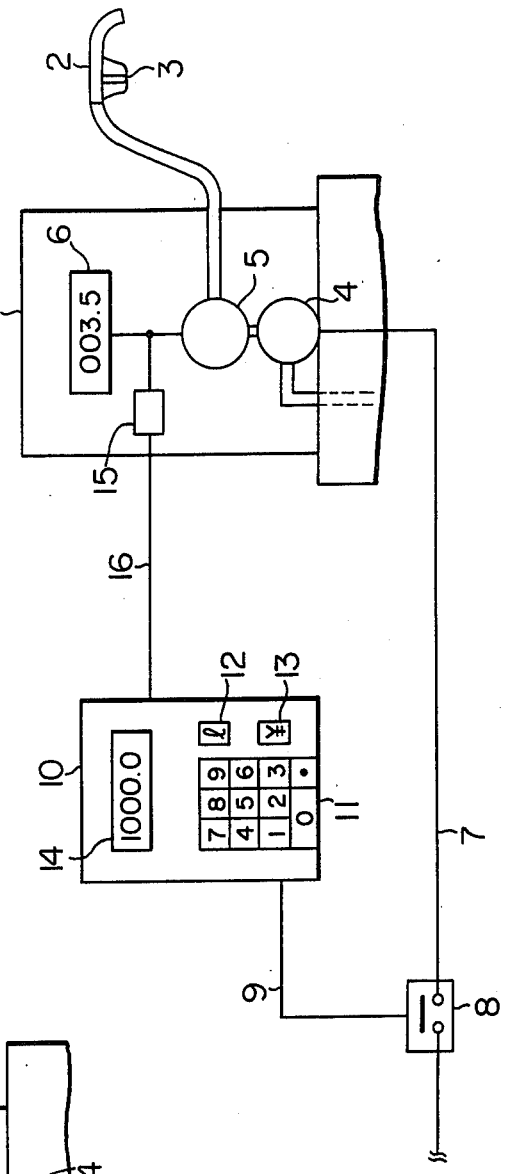

FIG. 3
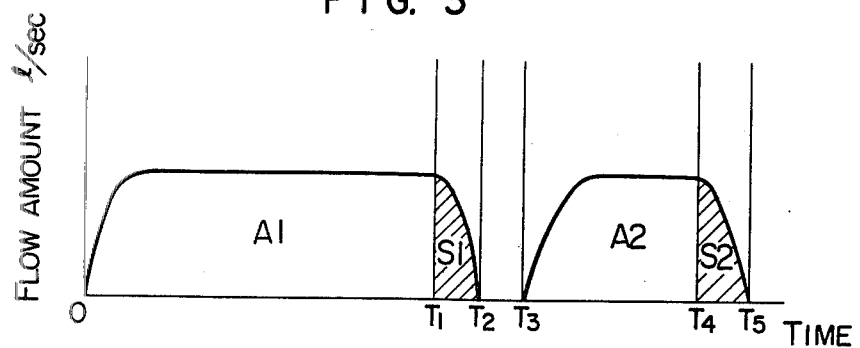
FIG. 5
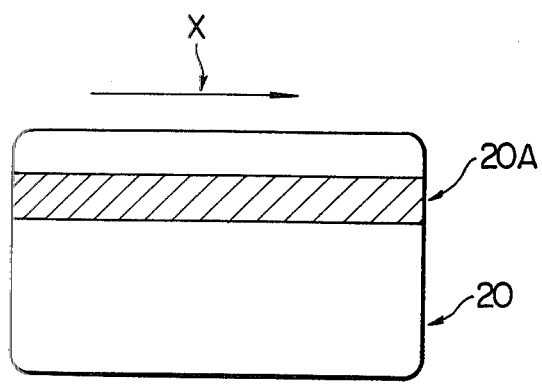
FIG. 6
| 1 | 2 | 3 | 4 | 0 | 1 | 5 |

REFUELING SYSTEM ADAPTED TO GASOLINE SERVICE STATION

This invention relates to a refueling system adapted to as a gasoline service station (hereinafter referred to a station) at which fuel such as gasoline is sold and more particularly to an automated and accurate refueling system which assists the gasoline service station attendant in selling an amount of fuel ordered or an amount of fuel corresponding to an amount of money offered by a customer.

A refueling machine as shown in FIG. 1 at reference numeral 1 has hitherto been used in a station to feed gasoline. With the refueling machine, a lever 3 attached to a nozzle 2 is operated so that gasoline is fed to an automobile through a pump 4, a flowmeter 5 and the nozzle 2. The flowmeter 5 acts on an indicator 6 to cause it to indicate the amount of gasoline which has been dispensed.

With this refueling machine 1, when a definite amount of fuel ordered by a customer is to be refueled, that is, in the case of a fixed amount refueling mode, the station attendant must monitor constantly the indicator 6 and regulate the refueling amount to the ordered amount by operating the lever 3 of the nozzle 2 at the time the indication of the indicator 6 approximates the ordered amount. On the other hand, when customers offer a fixed price, that is, in the case of a fixed price refueling mode, the station attendant must reckon, first of all, an amount of gasoline corresponding to the offered price and in accordance with a reckoned amount, written down or memorized, render a refueling service in the same manner as in the definite or fixed amount refueling mode.

In other words, for the fixed amount or fixed price refueling with the ordinary refueling machine, the station attendant must monitor constantly the indication on the machine during refueling and if he neglects monitoring, fuel in excess of the ordered amount is delivered and charging the customer for the balance cannot be justified. In the case of a fixed price refueling mode, the fixed price need be converted into a corresponding amount of fuel. An inadvertent erroneous conversion will trouble the customer and the station loses the customer's good will. Especially, frequent changes in the unit price of gasoline leads to a troublesome and elaborate calculation for the conversion and errors in the conversion are liable to occur.

Moreover, since he is constantly busy monitoring the indicator during refueling, the station attendant has no time to carry out other tasks with the result that such services as cleaning and inspection of automobiles can be rendered only after completion of refueling, thus degrading the working efficiency of the attendant and service to the customers.

This invention is an approach to solution of the above problems and will be described by way of example with reference to the following accompanying drawings.

FIG. 1 is a schematic diagram showing the construction of a refueling machine conventionally used in a gasoline service station;

FIG. 2 is a schematic diagram useful in explaining the construction of a refueling system adapted to a gasoline service station according to the invention;

FIG. 3 is a graphic representation useful in explaining the operation of the refueling system according to the invention;

FIG. 5 is a plan view of an example of a card used in the arrangement of FIG. 4; and FIG. 6 is a diagrammatic representation showing an example of intelligence recorded on the card of FIG. 5.

Figure 4:
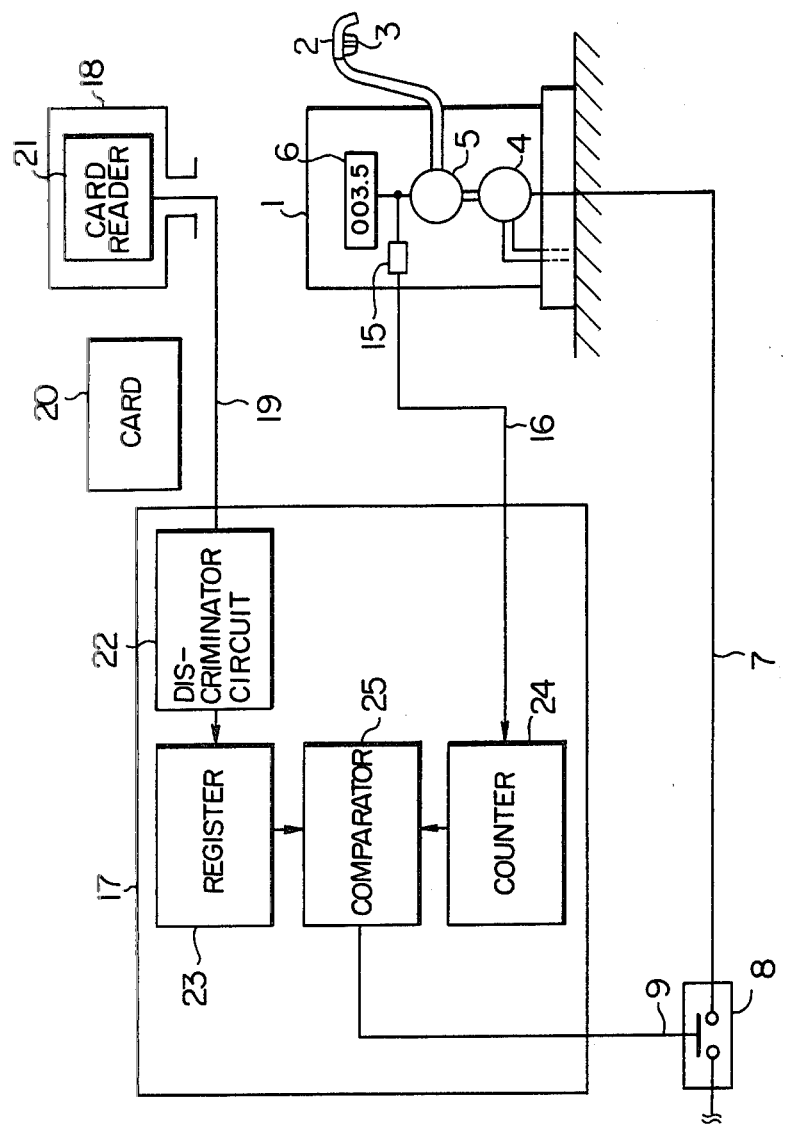
FIG. 4 is a schematic diagram showing an example of an arrangement for practicing the refueling system of the invention.

Referring to FIG. 2 showing a refueling system embodying the invention, the refueling machine 1 comprised of elements 2 to 6 is similar to the conventional system shown in FIG. 1. A pump 4 of the refueling machine 1 is connected via a power line 7 to an electromagnetic relay 8 which is controlled via a signal line 9 to switch the supply of power onto the power line 7. The signal line 9 is connected to a controller 10 which performs operations in accordance with this invention.

The controller 10 comprises input sections 11, 12 and 13 for inputting a fixed amount ordered and a fixed price offered by the customer, and an indicator 14 for indicating an input value.

A signal transmission unit 15 is provided for transmitting a value measured by the flowmeter 5 of the refueling machine 1 to the controller 10 via a signal line 16.

The controller 10 has various functions such as converting a price input into a corresponding amount of fuel, integrating the inputs from the signal line 16 and comparing the input value with the integrated value.

The operation of the system of the invention will be described with reference to FIG. 3. In the following description, an ordered value L denotes an amount of fuel ordered or an amount of fuel converted from a price offered by the customer. The refueling operation is best shown in FIG. 3 where the abscissa represents time and the ordinate represents flow rate.

When an ordered value L is input to the controller 10, the electromagnetic relay 8 is closed and the refueling machine is ready to refuel. The lever 3 of the nozzle 2 is then operated to start refueling by an amount $A_1$ as shown in FIG. 3. The controller 10 shown in FIG. 2 meters the amount $A_1$ and at a time $T_1$ at which $A_1 < L$, opens the contact of the electromagnetic relay 8 of FIG. 2 to thereby stop the pump 4 of the refueling machine 1. By virtue of inertia, however, the refueling by the machine 1 continues to a time $T_2$. The controller 10 measures an amount of filled fuel $S_1$ between times $T_1$ and $T_2$ and changes the ordered value L to $L - S_1$.

Thereafter, the controller 10 closes the contact of the electromagnetic relay 8 at a time $T_3$ to cause the refueling machine 1 to restart refueling by an amount $A_2$ as shown in FIG. 3. Then, at a time $T_4$ amounting to $$L - S_1 = A_1 + S_1 + A_2 \quad (1)$$

the controller 10 opens the electromagnetic relay 8 to stop the pump 4 of the refueling machine 1. By virtue of inertia, the refueling machine 1 continues to fill fuel by an amount $S_2$ until $T_5$.

The refueling operation is completed in this manner and an amount of filled fuel l in total amounts to $$l = A_1 + S_1 + A_2 + S_2 \quad (2)$$

From equation (1), the ordered value L in the controller 10 is, $$L = A_1 + S_1 + A_2 + S_2 \quad (3)$$

and then combining equations (2) and (3), the difference between ordered value L and filled amount l is given as $$L - l = S_1 - S_2.$$

Thus, it is possible to establish $S_1 = S_2$ by adjusting the time $T_1$ at which the refueling machine 1 is first stopped. Practically, $S_1 = S_2$ can easily be established by determining that $A_1 = (\frac{1}{2})L$.

In this way, fuel can be filled automatically to the ordered value L by means of the controller 10.

The refueling system of this invention as described so far can be put into practice with maximum effectiveness and economy by an arrangement as shown in FIG. 4. Essentially, the arrangement shown in FIG. 4 is adapted to the station for automatically totalling the amount of filled fuel. Elements 1 to 9, 15 and 16 in FIG. 4 correspond to those in FIG. 2. A controller as designated by reference numeral 17 in this example is connected to receive a refueling signal from the signal transmission unit 15 via the signal line 16 and to supply a control signal to an electromagnetic relay 8 via a signal line 9.

The contents of a card 20 offered by the customer are read by a card reader 21 installed in a terminal unit 18 and sent to the controller 17 via a signal line 19. Card intelligence sent from the terminal unit 18 is received by a discriminator circuit 22 and descriminated thereby so that an ordered value is set into a register 23. A counter 24 counts up or integrates the refueling signal from the signal transmission unit 15 of the refueling machine 1, and a comparator 25 compares the contents of the register 23 with the contents of the counter 24 to control the electromagnetic relay 8 adapted to switch on and off the a power line 7 connected to the refueling machine 1.

Various types of card readers 21 for reading out the contents of the card 20 offered by the customer are conceivable depending on the type of card 20 used. For example, (1) When a magnetic card is used wherein intelligence is recorded in the form of magnetic inversion on card surface magnetic stripes, a magnetic card reader may be used which converts magnetic inversion intelligence into electrical signals;

(2) When a punched card is used which stores intelligence in the form of a pattern of punched holes, a punched card reader may be used which converts the pattern of the punched holes into electrical signals; and (3) When an invoice card is used which records intelligence in the form of relief invoice characters on the card surface, an invoice card reader may be used which converts the invoice characters into electrical signals.

An example of a magnetic card is shown in FIG. 5, in which magnetic inversion intelligence oriented in the direction of arrow X is recorded on a magnetic stripe 20A on the surface of the card 20.

An example of the contents of the intelligence recorded on the magnetic stripe 20A of the magnetic card 20 is shown in FIG. 6. In this example, a figure "1234015" is recorded.

With the system as shown in FIG. 4, the refueling by the ordered value or amount can be carried out using the magnetic card 20 storing intelligence as shown in FIG. 6, as will be described below.

Prior to describing the refueling operation, the format of the intelligence of FIG. 6 will first be described in more detail. Of seven digits in the figure "1234015", the upper four digits "1234" constitute a card recognition code which identifies the customer having the card 20 in hand whereas the lower three digits "015" constitute an ordered refueling value code which, in this example, indicates that the ordered value is 15 liters. Accordingly, it is determined by the card intelligence of FIG. 6 that a customer of recognition code "1234" orders a 15-liter refueling. In the system of FIG. 4, if the terminal unit 18 is attached, in addition to the card reader 21, with an ordered value inputting section as shown in FIG. 2, it is possible to input the ordered value without resort to the card intelligence.

When the card 20 carrying such intelligence is inserted into the terminal unit 18, the card intelligence "1234015" is sent to the discrimination circuit 22 of the controller 17 via the signal line 19. The discriminator circuit 22 discriminates the ordered value from the received signal and sets a value of 15 liters in the register 23. At this time, the count of the counter 24 is zero (liter).

The comparator circuit 25 then judges that the count of the register 23 is larger than the count of the counter 24, and it closes the electromagnetic relay 8 to make the refueling machine 1 ready to operate. The station attendant is now ready to perform refueling by operating the lever 3 on the nozzle 2 of the refueling machine 1. The refueling thus proceeds by the amount $A_1$ shown in FIG. 3 and in this phase the counter 24 counts the signal from the signal transmission unit 15.

Subsequently, when one-half the count of register 23 equals the count of counter 24 at time $T_1$, the comparator circuit 25 opens the electromagnetic relay 8 to thereby stop the operation of the refueling machine 1. By virtue of mechanical inertia, however, refueling by the amount $S_1$ is performed through the refueling machine 1. At this time, the counter 24 counts up the signal from the signal transmission unit 15 and concurrently therewith subtracts $S_1$ from the count of the register 23.

After a predetermined time has elapsed from time $T_1$, that is, at time $T_3$ which is subsequent to time $T_2$ at which the refueling by the amount $S_1$ is completed, the comparator circuit 25 again closes the electromagnetic relay 8, thereby restarting the operation of the refueling machine 1 so as to fill fuel by the amount $A_2$ shown in FIG. 3. At this time, the counter 24 counts the signal from the signal transmission unit 15.

Thereafter, when the count of register 23 equals the count of counter 24, the comparator 25 opens the relay 8 to terminate the series of refueling operation at time $T_4$. Refueling by the amount $S_2$ continues, however, through the refueling machine 1 by virtue of mechanical inertia.

Assuming that the amounts $S_1$ and $S_2$ are each 0.2 liters, for instance, the contents of the register 23 and the counter 24 vary with time as tabulated in the following Table.

| Time | Register 23 | Counter 24 |
| --- | --- | --- |
| 0 | 15 l | 0 l |
| $T_1$ | 15 l | 7.5 l |
| $T_3$ | 14.8 l | 7.7 l |
| $T_4$ | 14.8 l | 14.8 l |
| $T_5$ | 0 l | 0 l |

As will be seen from this Table, the count amounts to 14.8 l at time $T_4$ but because of refueling by the amount $S_2$, the amount of fuel fed from the refueling machine 1 is $14.8+0.2=15$ (l) which is equal to the ordered value.

It will be appreciated from the foregoing description that the arrangement of FIG. 4 can be used to practice the present invention by providing the terminal unit 18 with the function to input the amount of fuel ordered or price offered by the customer so that the controller 17 can perform the controlling according to the invention. If the terminal unit 18 has an additional function to receive cash, the customer can refuel by a desired accurate amount without assistance of the station attendant by putting in cash corresponding to the desired amount to the terminal unit.

As described above, the refueling system of the present invention is advantageous in that:

(1) In any of the fixed amount or fixed price refueling mode, the station attendant simply occupies himself in inputting the amount ordered or the price offered by the customer into the controller to cause it to automatically refuel by the amount ordered. Accordingly, there is no need to monitor indications on the refueling machine in contrast to conventional refueling and hence the station attendant can offer another services to the customer during refueling;

(2) Since the refueling machine can be stopped automatically by means of the controller, fuel in excess of the ordered value or the offered price will not be supplied, preventing excessive refueling for which cost cannot be charged;

(3) The controller may function to change the rate of refueling in accordance with a change in unit price of gasoline. Accordingly, it is possible to automatically and accurately convert an ordered price into the corresponding amount by inputting the changed unit price into the controller. This obviates the conventional work of rate conversion, obviates possible conversion error and facilitates refueling even if the unit price of gasoline is changed frequently;

(4) The invention is applicable at low cost to the automatic refueling amount totalling arrangement shown in FIG. 4; and (5) The terminal unit 18 in FIG. 4 may function to receive cash. Then, the customer can refuel without assistance of the station attendant and a so-called unattended station may be managed.

What is claimed is:

1. A refueling system for a gasoline service station, comprising:
    a refueling machine unit for feeding fuel;
    a flowmeter for measuring the amount of fuel fed by said refueling machine; and
    controller means for controlling said refueling machine unit, said controller means including:
    a register for setting a total amount of fuel to be fed;
    a counter for integrating the amount of fuel actually fed;
    means for detecting when a first amount of fuel has been integrated by said counter which is equal to one-half the total amount of fuel set into said register, said means then stopping the feeding of fuel by said refueling machine unit for a predetermined period;
    means for measuring the amount of fuel fed as a result of the inertia of said refueling machine unit during said predetermined period when the feeding of fuel is stopped, subtracting this measured amount of fuel from the total amount set into said register to provide a corrected fuel setting in said register and correcting the amount of fuel integrated by said counter to increase the count by this measured amount of fuel;
    means for restarting the feeding of fuel by said refueling machine after said predetermined period has elapsed, and
    means for detecting a second amount of fuel integrated by said counter after the correction thereof which is equal to said corrected fuel setting, said means then stopping the feeding of fuel by said refueling machine.

2. A system according to claim 1 wherein the controller means comprises means for reading out intelligence recorded on a card in correspondence with the customer, for controlling the refueling machine unit.

* * * * *